Patented Feb. 23, 1932

1,846,321

UNITED STATES PATENT OFFICE

MAX DOHRN, OF BERLIN-CHARLOTTENBURG, AND ALBRECHT THIELE, OF BERLIN, GERMANY, ASSIGNORS TO SCHERING-KAHLBAUM A.-G., OF BERLIN, GERMANY

PROCESS FOR MAKING METAL SALTS OF HALOGEN SUBSTITUTED QUINOLINE CARBOXYLIC ACIDS AND THE PRODUCTS

No Drawing.  Application filed August 22, 1928.  Serial No. 301,430.

Our invention refers to the production of pharmaceutical products especially of substances which make visible the vesicle of the gall in the Roentgen-treatment.

We have found that the salts of the halogen-substituted quinolinecarboxylic acids with the alkaline earth or the heavy metals are of great therapeutical value because they make the vesicle of the gall visible in treatment with Roentgen-rays.

These salts are produced by treating the alkali salts of the halogen-substituted quinolinecarboxylic acids with the salts of the alkaline earth or with the salts of the heavy metals. They can also be obtained by treating the halogen-substituted quinolinecarboxylic acids with the oxides or hydroxides of the alkaline earths or the heavy metals.

These products have the following general formula:

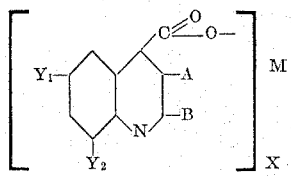

wherein M is a metal of the group consisting of iron, copper, silver, lead and the alkaline earth metals, X is the valence of the said metal, $Y_1$ a halogen atom and $Y_2$ a halogen atom or hydrogen, B is methyl or a para-iodo-substituted phenyl group and A is hydrogen or a carboxy group saturated with the above said metal, which salts are insoluble in water and most organic solvents and make the vesicle of the gall visible in Roentgen treatment.

Example 1

100 g. 2-p-iodophenyl-6-iodo-quinoline-4-carboxylic acid (obtained by boiling p-iodo-acetophenon with 5-iodoisatin) are dissolved in 5-6 litres hot water containing 8,5 g. sodium hydroxide. To this solution is added under stirring a hot solution of 44 g. crystallized calcium chloride in a small quantity of water. The precipitate is filtered, washed and dried. The salt is insoluble in water, alcohol and ether and contains 3,9% calcium and 48,7% iodine.

This calcium salt of the 2-p-iodophenyl-6-iodoquinoline-4-carboxylic acid can also be obtained by shaking an aqueous suspension of the 2-p-iodophenyl-6-iodoquinoline-4-carboxylic acid with milk of lime. The resulting product has the following formula:—

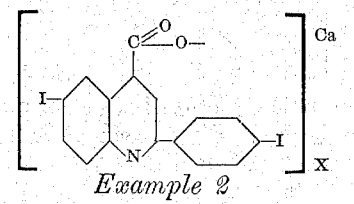

Example 2

100 g. 2-p-iodophenyldibromoquinolinecarboxylic acid, obtained by boiling p-iodo-acetophenon with dibromoisatine, are dissolved or suspended in water containing 8 g. sodium hydroxide and to the solution (or suspension) is added a solution of 40 g. crystallized magnesium chloride. The precipitate is filtered, washed and dried. The magnesium salt of the 2 para-iodo-6,8-dibromo-quinoline-4-carboxylic acid, having the formula:

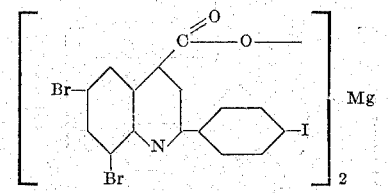

is a yellowish powder insoluble in water.

Example 3

100 g. 5,8-dibromo-2-methylquinoline-3, 4-dicarboxylic acid (obtained by boiling aceto-acetic-acid-ethylester with 5,7 dibromoisatine) as described in Example 1, are dissolved in diluted caustic soda solution and precipitated with a solution of the calculated quantity of iron perchloride.

The product produced with this example has the following formula:

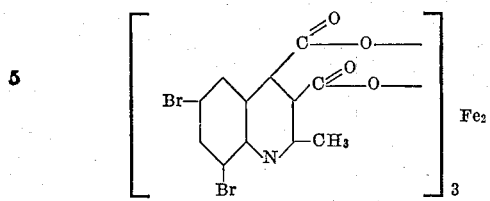

In the same manner can also be obtained the copper, silver or lead salts of the halogen substituted quinoline-carboxylic acids.

Various changes may be made in the details without departing from the invention or sacrificing the advantages thereof.

We claim:—

1. As new compounds the salts of halogen substituted quinoline-carboxylic acids with the metals of the groups consisting of iron, copper, silver, lead and the alkaline earth metals which salts are insoluble in water and most organic solvents and make the vesicle of the gall visible in Roentgen treatment.

2. As new compounds the salts of the halogen substituted phenyl-quinoline carboxylic acids of the formula:

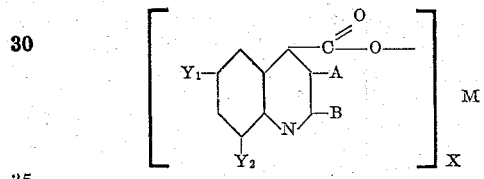

wherein M is a metal of the group consisting of iron, copper, silver, lead and the alkaline earth metals, X is the valence of the said metal, $Y_1$ a halogen atom and $Y_2$ a halogen atom or hydrogen, B is methyl or a para-iodo-substituted phenyl group and A is hydrogen or a carboxy group saturated with the above said metal which salts are insoluble in water and most organic solvents and make the vesicle of the gall visible in Roentgen treatment.

3. As new compounds the salts of the halogen substituted phenyl-quinoline carboxylic acids of the formula:

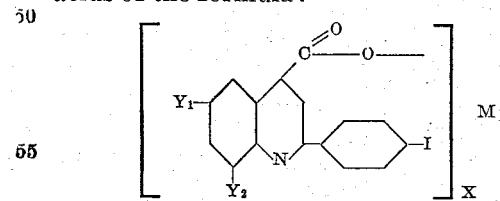

wherein M is a metal of the group consisting of iron, copper, silver, lead and the alkaline earth metals, X is the valence of the said metal, $Y_1$ is a halogen atom and $Y_2$ a halogen atom or hydrogen which salts are insoluble in water and most organic solvents and make the vesicle of the gall visible in Roentgen treatment.

4. As a new compound the salts of the 2-p-iodo-phenyl-6-iodo-quinoline-4-carboxylic acid of the formula:

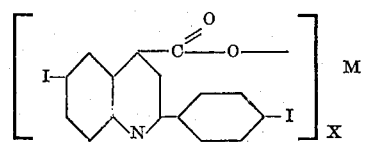

wherein M is a metal of the group consisting of iron, copper, silver, lead and the alkaline earth metals, X is the valence of the said metal, which salts are insoluble in water and most organic solvents and make the vesicle of the gall visible in Roentgen treatment.

5. As a new compound the calcium salt of the 2-para-iodo-phenyl-6-iodo-quinoline-4-carboxylic acid of the formula:

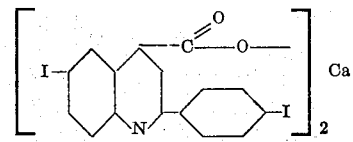

insoluble in water and most organic solvents and making the vesicle of the gall visible in Roentgen treatment.

6. The process of producing the salts of the halogen substituted quinoline carboxylic acids with the metals of the group consisting of iron, copper, silver, lead and the alkaline earth metals, comprising treating the sodium salts of the said acids with the water soluble salts of the metals of the group consisting of iron, copper, silver, lead and the alkaline earths.

MAX DOHRN.
ALBRECHT THIELE.